United States Patent
Bidkar et al.

(10) Patent No.: US 12,270,305 B2
(45) Date of Patent: Apr. 8, 2025

(54) SEAL ASSEMBLY FOR A ROTARY MACHINE

(71) Applicant: General Electric Company, Schenectady, NY (US)

(72) Inventors: Rahul Anil Bidkar, Niskayuna, NY (US); Deepak Trivedi, Niskayuna, NY (US); Christopher Edward Wolfe, Niskayuna, NY (US); Darren Lee Hallman, Niskayuna, NY (US); Kristopher Frutschy, Niskayuna, NY (US); Mark Bowen, Niskayuna, NY (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 17/908,368

(22) PCT Filed: Mar. 30, 2020

(86) PCT No.: PCT/US2020/025781
§ 371 (c)(1),
(2) Date: Aug. 31, 2022

(87) PCT Pub. No.: WO2021/201828
PCT Pub. Date: Oct. 7, 2021

(65) Prior Publication Data
US 2023/0106380 A1 Apr. 6, 2023

(51) Int. Cl.
*F01D 11/02* (2006.01)
*F16J 15/447* (2006.01)

(52) U.S. Cl.
CPC ......... *F01D 11/025* (2013.01); *F16J 15/4476* (2013.01); *F05D 2220/30* (2013.01); *F05D 2230/31* (2013.01); *F05D 2240/55* (2013.01)

(58) Field of Classification Search
CPC .................................................... F01D 11/025
See application file for complete search history.

(56) References Cited

U.S. PATENT DOCUMENTS 6,065,754 A * 5/2000 Cromer ............... F01D 11/025
277/412
6,250,641 B1 6/2001 Dinc et al.
(Continued)

FOREIGN PATENT DOCUMENTS

| JP | S58206805 A | 12/1983 |
|---|---|---|
| WO | WO2017220075 A1 | 12/2017 |
| WO | WO2019045590 A1 | 3/2019 |

OTHER PUBLICATIONS

PCT International Search Report Corresponding to PCT/US2020/025781 on Dec. 17, 2020.
(Continued)

*Primary Examiner* — Michael L Sehn
(74) *Attorney, Agent, or Firm* — Dority & Manning, P.A.

(57) ABSTRACT

A rotary machine seal assembly (200) includes seal segments (102) configured to circumferentially extend around a rotor (108) between a stator (106) and the rotor (108) of a rotary machine. One or more seal segments include a shoe plate (110, 410, 710, 910), a seal base (112, 412, 712, 912), and at least one intermediate member (114, 414, 714). The shoe plate is disposed along the rotor. The seal base is disposed radially outward of the shoe plate. At least one intermediate member is coupled to and disposed between the seal base and the shoe plate. The at least one intermediate member includes an actuator portion (302, 402, 702, 902) having first coefficient of thermal expansion and a constrictor portion (304, 404, 704, 904) having a different, second coefficient of thermal expansion. The at least one intermediate member is configured to move the shoe plate from a radially outward position to a radially inward position with
(Continued)

respect to the rotor responsive to the at least one intermediate member undergoing a temperature change.

16 Claims, 9 Drawing Sheets

(56) References Cited

U.S. PATENT DOCUMENTS

| | | | |
|---|---|---|---|
| 7,572,099 | B2 | 8/2009 | Addis |
| 9,359,908 | B2* | 6/2016 | Bidkar .................. F01D 11/02 |
| 9,587,746 | B2* | 3/2017 | Bidkar ................ F01D 11/025 |
| 10,060,278 | B2 | 8/2018 | Boeck |
| 10,138,747 | B2 | 11/2018 | Dev et al. |
| 2019/0178387 | A1 | 6/2019 | Nayak et al. |
| 2019/0203842 | A1 | 7/2019 | Bidkar et al. |

OTHER PUBLICATIONS

Dell et al., Design of a Clamp for a Thermoelectric Generator Using Bimetallic Thermal Properties, Proceedings of the ASME 2016 International Mechanical Engineering Congress and Exposition IMECE2016-68179, vol. 8, Phoenix Arizona, Nov. 11-17, 2016, 9 Pages.

Steinetz., 9 Seal Technology, Volume III Manufacturing and Management, Part 1 Manufacturing, Feb. 20, 2015, Manufacturing and Management Part 1, vol. III, pp. 1-41, Feb. 20, 2015, 41 Pages. https://doi.org/10.1002/9781118985960.meh309.

Vakili et al., Advanced Labyrinth Seals for Steam Turbine Generators, Proceedings of the ASME Turbo Expo 2006: Power for Land, Sea, and Air, vol. 3 Heat Transfer, Parts A and B, GT2006-91263, Barcelona Spain, May 8-11, 2006, pp. 1599-1608. https://doi.org/10.1115/GT2006-91263.

* cited by examiner

SEAL ASSEMBLY FOR A ROTARY MACHINE

FIELD

The subject matter described herein relates to seal assemblies in rotary machines.

BACKGROUND

Many rotary machines, such as gas turbines, steam turbines, aircraft engines, supercritical $CO_2$ turbines, compressors and other rotary machines, have seals between the moving components (e.g., rotors) and the stationary components (e.g., stators). These seals help to reduce leakage of fluids between the rotors and stators. Increased leakage between rotors and stators can significantly reduce the power generated by the rotary machines, thereby lowering the operating efficiency of the rotary machines.

Labyrinth seal assemblies, including packing rings and blade tip spill strips, are used for reducing the leakage through circumferential rotor-stator gaps from high pressure to low pressure cavities. Packing rings are assembled with a cold gap or clearance from the rotor. The radial clearance between the packing ring and the rotor varies during operation due to centrifugal growth and the relative thermal growth of the stator, the packing ring, and the rotor, prior to settling to a steady state operating clearance. The radial clearance between rotors and stators can change up to 3 millimeters on account of thermal transients and centrifugal growth. Packing rings that are assembled with small radial clearances result in seal rubs (which have increased wear and degraded leakage performance and potential rotor thermal bow), whereas packing rings assembled having large radial clearances to avoid seal rubs can lead to increased leakage. Packing rings are frequently damaged by seal rubs, leading to a need for replacement during maintenance outage cycles.

Typically, packing rings are fabricated with steel and steel alloys using forging and casting operations followed by machining operations. Conventional packing rings have an inherent thermal response due to the thermal behavior, or dimensional changes in response to temperature changes, dictated by the bulk dimensions of the packing ring and the coefficient of thermal expansion of the materials used to form the packing ring, as well as those of surrounding components such as the stator and the rotary machine casing. This inherent thermal response serves as a limitation when designing, or setting the cold clearances and corresponding steady state clearances, of conventional packing rings.

BRIEF DESCRIPTION

In accordance with one or more embodiments described herein, a rotary machine seal assembly is provided. The rotary machine seal assembly includes seal segments configured to circumferentially extend around a rotor between a stator and the rotor of a rotary machine. One or more of the seal segments include a shoe plate, a seal base, and at least one intermediate member. The shoe plate is configured to be disposed along the rotor. The shoe plate is configured to form a primary seal with the rotor and a secondary seal with a portion of the stator. The seal base is configured to be disposed radially outward of the shoe plate. At least one intermediate member is coupled to and disposed between the seal base and the shoe plate. The at least one intermediate member includes an actuator portion having a first coefficient of thermal expansion and a constrictor portion having a different, second coefficient of thermal expansion. The at least one intermediate member is configured to move the shoe plate from a radially outward position to a radially inward position with respect to the rotor responsive to the at least one intermediate member undergoing a temperature change.

Optionally, the first coefficient of thermal expansion of the actuator portion is greater than the second coefficient of thermal expansion of the constrictor portion.

Optionally, the constrictor portion is configured to cause the actuator portion to move the shoe plate farther in a radial direction than an intermediate member formed from a single metal or a single metal alloy.

Optionally, the actuator portion includes a bellows and the constrictor portion includes at least one wall radially extending from the seal base toward the shoe plate.

Optionally, the bellows includes one or more elongated structures that are one or more of concertinaed or convoluted to form a pattern along a length of the actuator portion extending in a radial direction.

Optionally, the actuator portion and the constrictor portion form a leaf spring.

Optionally, the at least one intermediate member includes a second intermediate member positioned between a radially outward surface of the seal base and the stator.

Optionally, the at least one intermediate member includes a third intermediate member and a fourth intermediate member, the third and fourth intermediate members positioned between the stator and a radially inward surface of the seal base at respective opposed first and second hook portions of the seal base.

Optionally, a portion of the shoe plate contacts the portion of the stator to form the secondary seal.

Optionally, the shoe plate includes one or more of an axial tooth extending in an axial direction towards the portion of the stator or one or more of a radial tooth extending in a radial direction towards the rotor.

Optionally, the shoe plate is configured to form a frictionless or low-friction secondary seal with a portion of the stator through a self-correcting fluid film disposed between a surface of the shoe plate and the portion of the stator.

In accordance with one or more embodiments described herein, a method is provided. The method includes additively forming one or more seal segments of a seal assembly for a rotary machine. The one or more seal segments are configured to circumferentially extend around a rotor between a stator and the rotor of the rotary machine. Additively forming one or more seal segments includes forming a seal base, at least one intermediate member, and a shoe plate. Forming at least one intermediate member includes forming at least one bi-material interface between an actuator portion comprising a first metal alloy and a constrictor portion comprising a second metal alloy. Additively forming one or more seal segments further includes joining a first end of the at least one intermediate member to the seal base and joining an opposing second end of the at least one intermediate member to the shoe plate.

Optionally, the coefficient of thermal expansion of the actuator portion is greater than the CTE of the constrictor portion.

Optionally, forming the at least one intermediate member includes configuring the constrictor portion to cause the actuator portion to move the shoe plate farther in a radial direction than an intermediate member formed from a single metal or a single metal alloy.

Optionally, forming the at least one intermediate member includes forming, as the actuator portion, a bellows, and forming, as the constrictor portion, at least one wall extending orthogonally from the seal base towards the shoe plate.

Optionally, the actuator portion and the constrictor portion form a leaf spring.

In accordance with one or more embodiments described herein, a rotary machine seal assembly is provided. The rotary machine seal assembly includes a packing ring formed from one or more seal segments configured to extend around a rotor between a stator and a rotor of a rotary machine. The one or more seal segments are configured to form one or more seals between the rotor and the stator. The one or more seal segments have an actuator portion and a constrictor portion. The actuator portion has a different coefficient of thermal expansion than the constrictor portion.

Optionally, the coefficient of thermal expansion of the actuator portion is greater than the coefficient of thermal expansion of the constrictor portion.

Optionally, the constrictor portion is configured cause the actuator portion to move the shoe plate farther in a radial direction than an intermediate member formed from a single metal or a single metal alloy.

Optionally, the actuator portion includes a bellows and the constrictor portion includes at least one wall radially extending from the seal base towards the shoe plate; and wherein the bellows includes one or more elongated structures that are one or more of concertinaed or convoluted to form a pattern with respect to a length of the actuator portion extending in a radial direction.

BRIEF DESCRIPTION OF THE DRAWINGS

The inventive subject matter described herein will be better understood from reading the following description of non-limiting embodiments, with reference to the attached drawings, wherein below.

DETAILED DESCRIPTION

Figure 1:
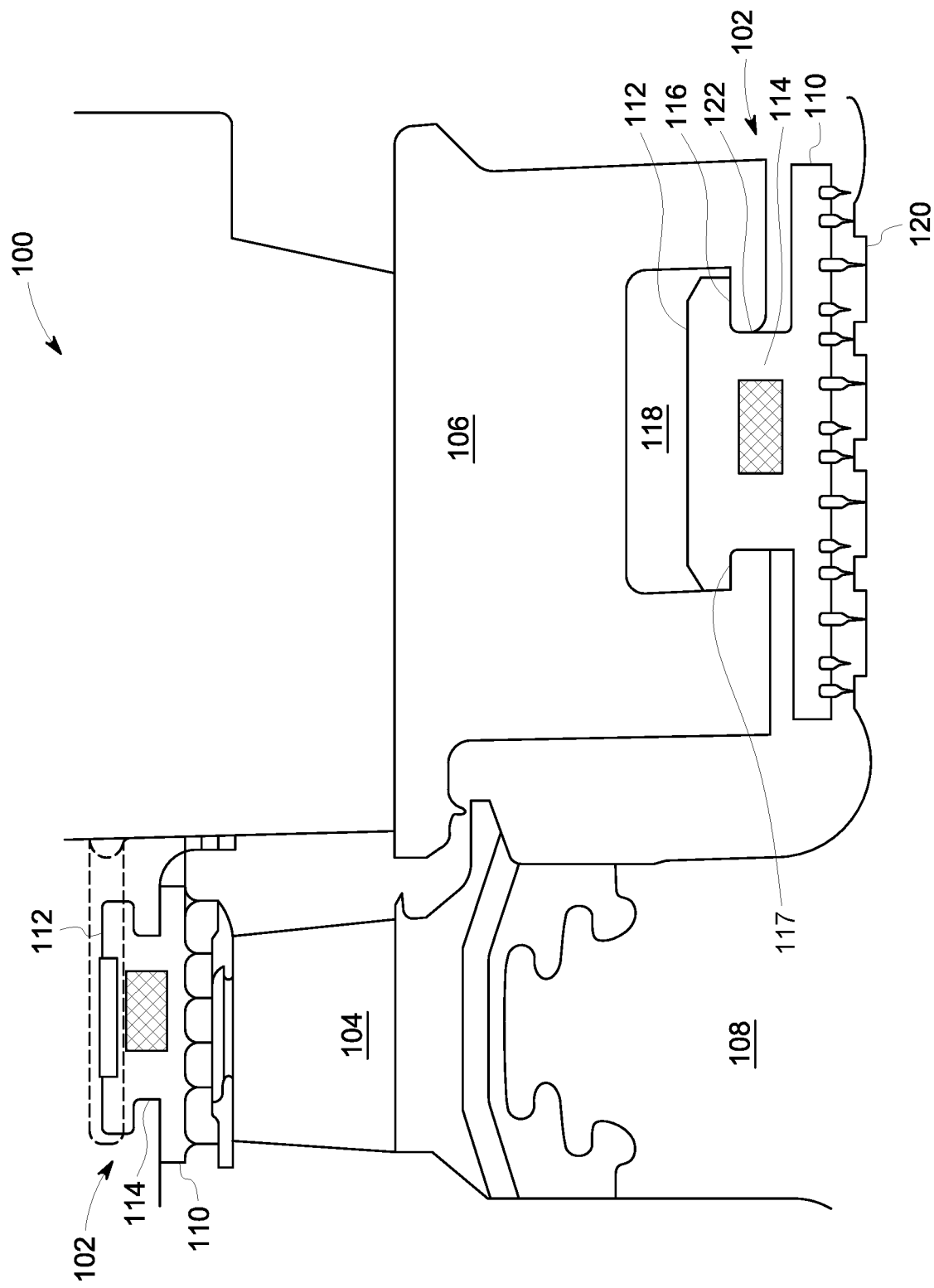
FIG. 1 illustrates a partial cross-sectional view of an example rotary machine in accordance with embodiments herein.

One or more embodiments of the inventive subject matter described herein provide seal assemblies for rotary machines. The seal assemblies can be used for sealing rotor-stator circumferential gaps in gas turbines, steam turbines, aircraft engines, supercritical $CO_2$ turbines, centrifugal compressors, and other rotary machinery. The seal assemblies include packing rings having a predetermined thermal response to reduce rotor-stator leakage. In one embodiment, a seal includes an assembly of several seal segments forming a 360-degree assembly. One or more of the seal segments of this seal include a shoe plate, a seal base, and at least one intermediate member coupled to and disposed between the seal base and the shoe plate. The intermediate member includes an actuator portion having a first coefficient of thermal expansion and a constrictor portion having a different, second coefficient of thermal expansion. The intermediate member moves the shoe plate between a radially outward position and a radially inward position with respect to the rotor responsive to the intermediate member undergoing a temperature change. Optionally, each segment can be attached individually to the stator of the rotary machinery or several segments can be attached simultaneously to a single stationary piece of the rotary machinery.

The seal assembly reduces the flow of the fluid (e.g., air) through the circumferential rotor-stator gap at start-up conditions, at steady state conditions, or at both start-up and steady state conditions relative to other types of seals, resulting in improved operating efficiency of the rotary machine. The seal assembly has a predetermined thermal response based on the thermal loads for an operating environment. The predetermined thermal response includes a cold radial dimension and a steady state radial dimension. The seal assemblies improve radial operation and significantly reduce the leakage rates of the seal assemblies over conventional seal assemblies by allowing for improved clearances with respect to the rotor.

Each segment can change length in a radial direction responsive to changes in temperature. Each segment has an increased effective coefficient of thermal expansion (CTE) in at least a radial direction relative to segments of conventional seals. The intermediate member of the seal segment changes length responsive to undergoing changes in temperature to move the shoe plate from a radially outward position to a radially inward position. Each segment can grow more in the radial direction than a conventional segment of a seal that does not have the greater coefficient of thermal expansion (e.g., a seal segment having an intermediate member formed from a single metal or single metal alloy) along the radial direction (given exposure to the same amount of temperature differential). For example, each segment can change length in the radial direction N*X, where X is the change in length in the radial direction and N is a real number greater than 1 (e.g., 1.1, 1.2, 1.5, 2, 2.5, 3, 4, 5, etc.)

One or more embodiments of the inventive subject matter described herein provide methods for forming seal assemblies for rotary machines. Such methods can include additively forming one or more seal segments of a seal assembly (or portions of one or more seal segments) for a rotary machine. Additively forming one or more seal segments includes forming a seal base, at least one intermediate member, and a shoe plate. Forming at least one intermediate member includes forming at least one bi-material interface between an actuator portion formed from a first metal alloy and a constrictor portion formed from a second metal alloy. Forming the at least one intermediate member may include configuring the constrictor portion to cause the actuator portion to move the shoe plate farther in a radial direction than a conventional seal assembly having seal segments with an intermediate members/portions formed from one metal or one metal alloy. A first end of the intermediate member is joined with the seal base and an opposing second end of the intermediate member is joined with the shoe plate. The respective coefficients of thermal expansion for the constrictor portion and the actuator portion, among other things, may be selected based on a desired predetermined thermal response for the seal segment. The desired predetermined thermal response for the seal segment may be based on the thermal loads for an operating environment.

The seal assemblies described herein can provide advantages over other existing labyrinth sealing technologies. One or more embodiments of the seal assemblies are relatively inexpensive to fabricate and present a reliable, robust seal for several locations in rotary machinery with high pressure drops and large transients. One or more embodiments of the seal assemblies provide for a tailored predetermined thermal response to improve performance over conventional seals. One or more embodiments of the seal assemblies provides for additively forming seal assemblies. Additively formed seal assemblies having a tailored predetermined thermal response present a relatively inexpensive replacement option for leaky, less effective seal assemblies that also improves the overall efficiency of the rotary machine Further, additively formed seal assemblies are also a relatively fast and inexpensive repair option for restoring damaged seal assemblies within a repair cycle compared to replacement with conventional seal assemblies that have long lead cycles and costly inventory management schemes.

FIG. 1 illustrates a partial cross-sectional view of an example rotary machine 100 in accordance with embodiments herein. Seal assemblies in accordance with embodiments herein may be used for sealing rotor-stator gaps in a variety of locations to manage (e.g., to reduce) the leakage of pressurized fluid from high pressure cavities to low pressure cavities in or on opposite sides of the rotary machine. The rotary machine 100 includes a moveable (e.g., rotating) stepped rotor 108, rotor blades 104, and a stationary diaphragm (for a steam turbine) or stator, 106. The rotor 108 rotates relative to the stator 106 and the seal assembly by rotating around or about an axis of rotation 124 (that coincides with or extends parallel to an axial direction 124 of the rotary machine 100). In one example, seal segments 102 of a seal assembly may be positioned at an interface between the rotor blade 104 and the stator 106 of the rotary machine 100. In additional or alternative examples, seal segments 102 of a seal assembly may be positioned at an interface between the rotor 108 and the stator 106.

One or more of the seal segments 102 of a seal assembly include a shoe plate 110 configured to be disposed along the rotor 108 (reference to the rotor 108 being inclusive of the rotor blade 104 throughout) and a seal base 112 configured to be disposed radially outward of the shoe plate 110, and at least one intermediate member 114 coupled to and disposed between the seal base 112 and the shoe plate 110. In some examples, the seal base 112 may be configured to be at least partially disposed in an annular T-shaped groove 118 disposed in the stator 106. The seal base 112 may include hooks 116 that extend past and engage shoulders 117 of the T-shaped groove 118 of the stator 106. In additional or alternative examples, portions of the shoe plate 110 ideally operate at a very small radial clearance (along radial direction 126) away from the rotor 108 to form a primary seal at a primary seal interface 120. Portions of the intermediate member 114 contact portions of the stator 106 to form a secondary seal at a secondary seal interface 122 or both. The at least one intermediate member 114 is configured to move the shoe plate 110 from a radially outward position (e.g., a cold clearance position) to a radially inward position (e.g., a steady state clearance position) along a radial direction 126 with respect to the rotor 108 responsive to the at least one intermediate member 114 undergoing a temperature change.

Figure 2:
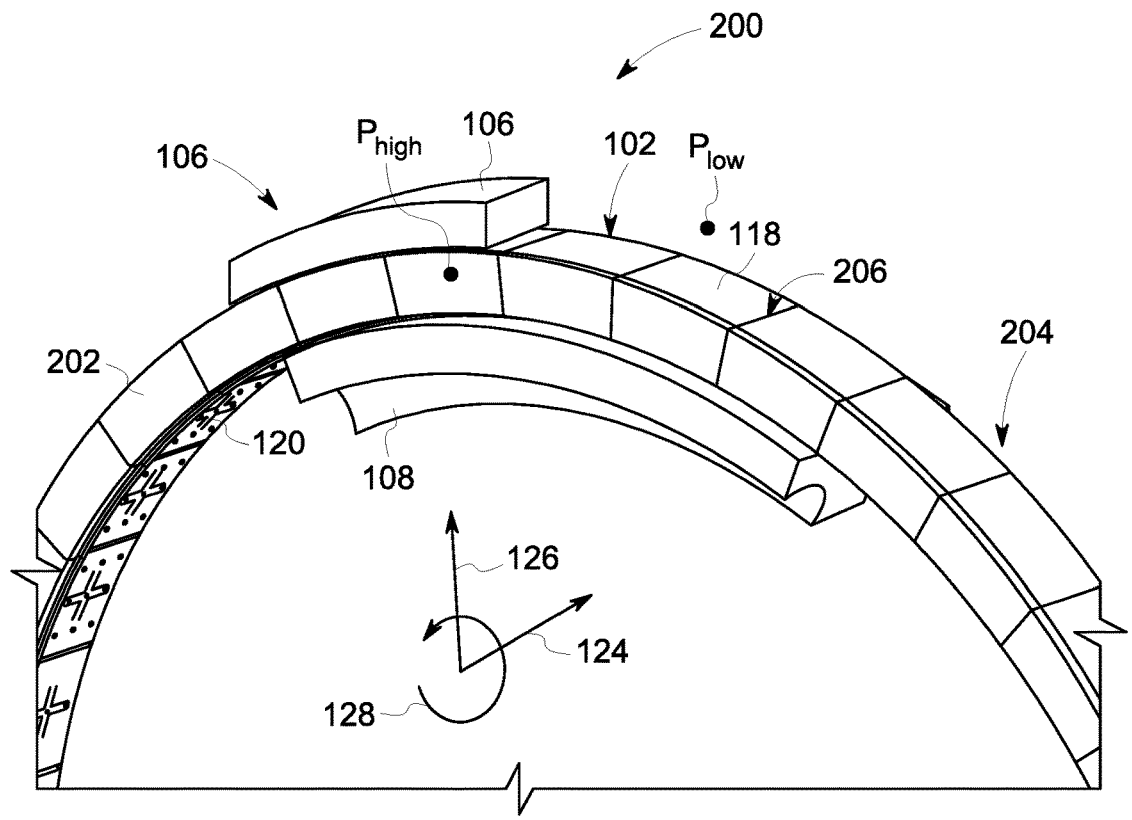
FIG. 2 illustrates a front perspective view of a seal assembly in conjunction with part of a rotary machine in accordance with embodiments herein.

FIG. 2 illustrates a front perspective view of a seal assembly 200 in conjunction with part of a rotary machine in accordance with embodiments herein. The seal assembly 200 is formed by assembling several seal segments 102 circumferentially around the axis of rotation 124 along a circumferential direction 128 and between the rotor 108 and the stator 106. The seal assembly 200 is used to reduce the leakage of fluid (e.g., working fluid, exhaust or other gases) between a cavity that is upstream of the rotor 108 and seal assembly 200 (e.g., along the axial direction 124) and a cavity that is downstream of the rotor 108 and seal assembly 200 in the rotary machine (e.g., along the axial direction 124). Higher pressure fluid (shown as $P_{high}$ in FIG. 2) in the upstream cavity passes through along the axial direction 124 to the downstream cavity as lower pressure fluid (shown as $P_{low}$ in the Figures) along the axial direction 124 shown in FIG. 1. A first side 202 of the seal segments 102 face the high-pressure fluid in the upstream cavity. An opposite second side 204 of the seal segments 102 (not visible in FIG. 1) face the low-pressure fluid in the downstream cavity.

The neighboring seal segments 102 are separated by a small intersegment gap 206 that allows for free motion of the individual seal segments 102 relative to each other (predominantly in the radial direction 126) of each segment 102, which is unaffected by the neighboring seal segments 102. Each seal segment 102 includes a stator interface portion or seal base 112 that faces and/or directly engages the stator 106 and an opposite shoe plate 110 that faces the rotor 108. In some examples, the seal base 112 may be used for attaching (e.g., by bolting, brazing, hooking, or welding) each seal segment 102 to the stator 106. The shoe plate 110 optionally may include spline seals that reduce or eliminate fluid leakage between the neighboring seal segments 102 in one embodiment.

The seal segments 102 include seal bases 112, which serve as a stator interface element and may be curved to match the circumferential curvature of the stator 106. The seal segments 102 also include shoe plates 110 that are opposite of the seal bases 112. The shoe plates 110 in neighboring seal segments 102 may be interlocked with each other by slanted faces or surfaces that reduce leakage of fluid between the neighboring shoe plates 110.

Figure 3:
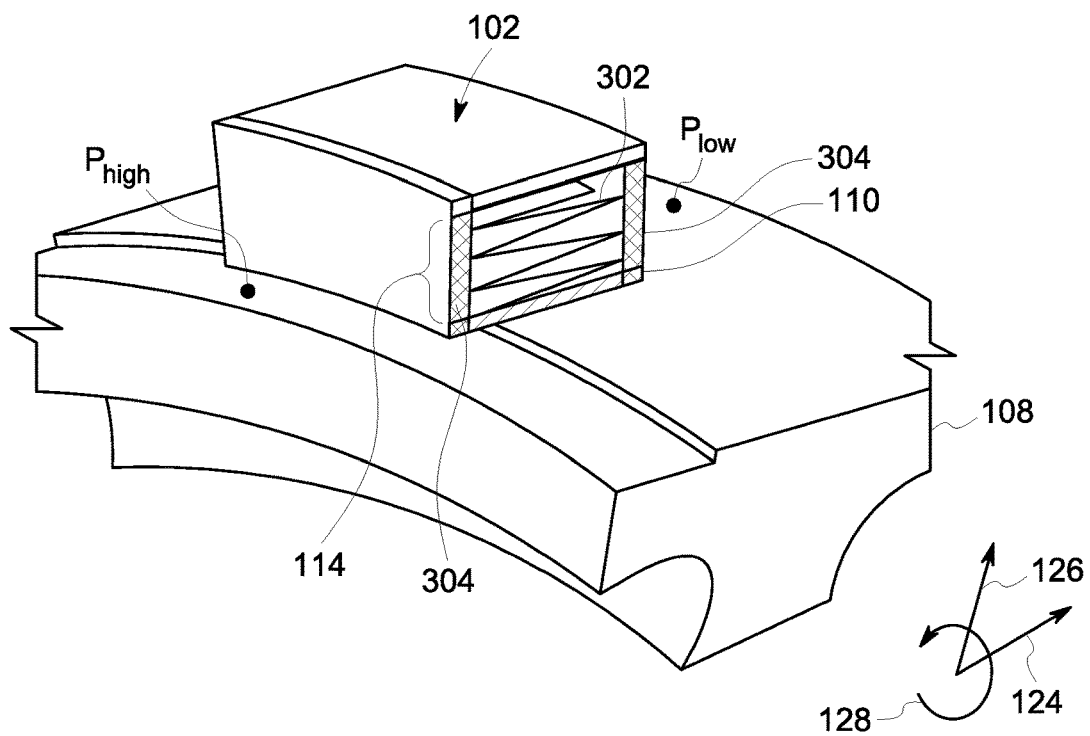
FIG. 3 illustrates a front perspective cross-sectional view of one seal segment in the seal assembly in accordance with embodiments herein.

FIG. 3 illustrates a front perspective cross-sectional view of one seal segment 102 in the seal assembly 200 in accordance with embodiments herein. The shoe plates 110 and seal bases 112 are coupled with each other by intermediate members 114. The intermediate members 114 moveably support the shoe plates 110 with the seal bases 112 in that the intermediate members 114 can move the shoe plates 110 from a radially outward position to a radially inward position relative to the rotor 108 in response to the intermediate member 114 undergoing a temperature change. The intermediate member 114 may move from the radially inward position to the radially outward position (or vice versa) as the radial distance between the stator 106 and rotor 108 changes during operation of the rotary machine 102. For example, during rotation of the rotor 108 relative to the seal assembly, the intermediate member 114 may become heated and expand to move radially inward. The intermediate member 114 includes an actuator portion 302 having a first coefficient of thermal expansion and a constrictor portion 304 having a different, second coefficient of thermal expansion. The intermediate member 114 has a predetermined thermal response based on the thermal loads for an operating environment associated with the rotary machine. The predetermined thermal response of the intermediate member 114 includes a cold radial dimension (e.g., corresponding to the radially outward position) and a steady state radial dimension (e.g., corresponding to the radially inward position). Seal assemblies 200 including the seal segments 102 improve radial operation and significantly reduce the leakage rates of the seal assemblies 200 over conventional seal assemblies (e.g., having seal segments having intermediate members/portions formed from one metal or one metal alloy) by allowing for improved clearances with respect to the rotor 108. For example, the seal assemblies 200 reduce the flow of the fluid (e.g., air) through the circumferential rotor-stator gap at steady state conditions relative to conventional seals, resulting in improved operating efficiency of the rotary machine.

Figure 4:
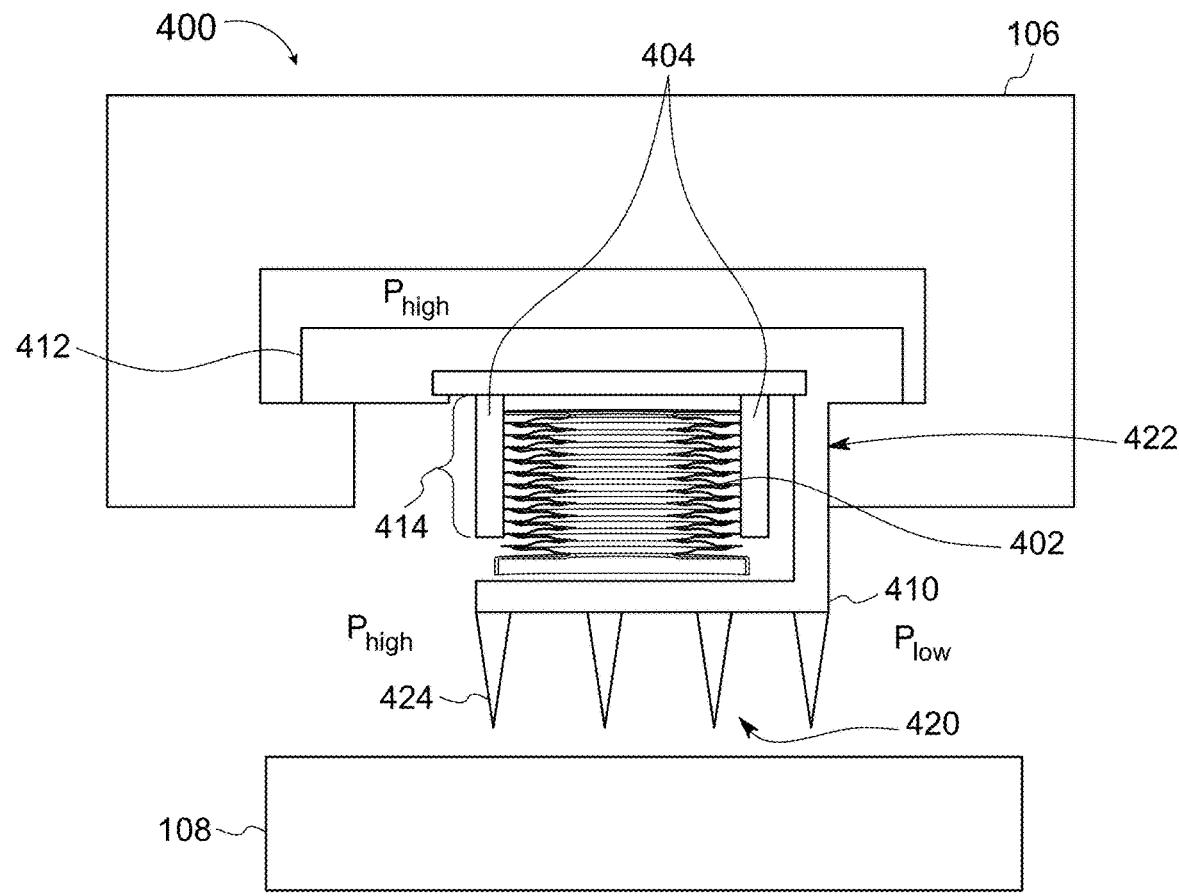
FIG. 4 illustrates a cross-sectional view of one example of a seal segment in accordance with embodiments herein.
Figure 5:
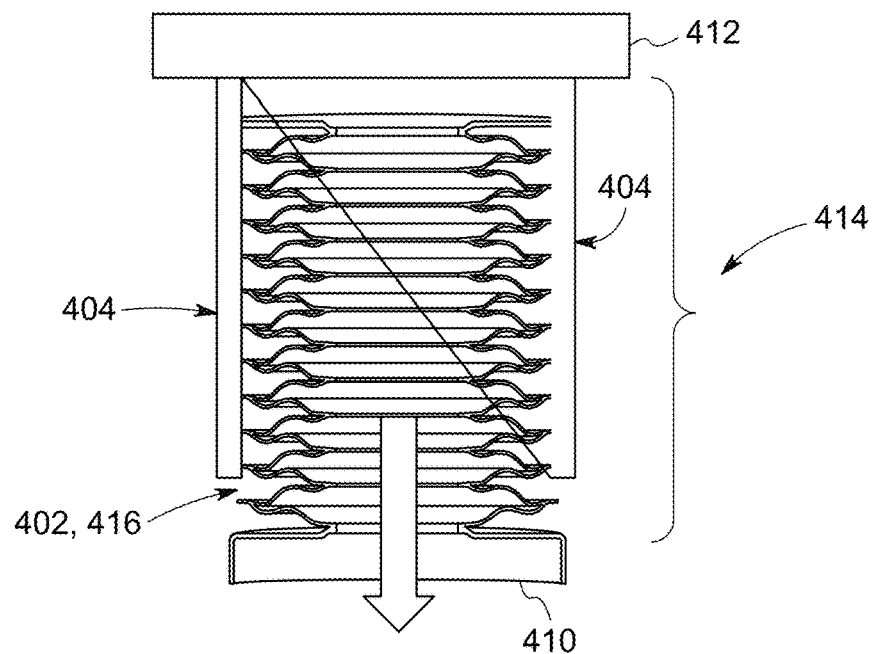
FIG. 5 illustrates a cross-sectional view of one example of an intermediate member in accordance with embodiments herein.

FIG. 4 illustrates a cross-sectional view of one example of a seal segment in accordance with embodiments herein. The seal segment 400 includes a shoe plate 410, a seal base 412, and at least one intermediate member 414 coupled to and disposed between the seal base 412 and the shoe plate 410. FIG. 5 illustrates an enlarged cross-sectional view of the intermediate member 114 of FIG. 4 in accordance with embodiments herein. The intermediate member 414 includes an actuator portion 402 having a first coefficient of thermal expansion and a constrictor portion 404 having a different, second coefficient of thermal expansion. The actuator portion 402 may include a bellows 416 and the constrictor portion 404 may include at least one wall radially extending from the seal base 412 towards the shoe plate 410. The bellows 416 may include one or more elongated structures that are one or more of concertinaed or convoluted to form a pattern along a length of the actuator portion 402 extending in the radial direction 126. The first coefficient of thermal expansion of the actuator portion 402 may be greater than the second coefficient of thermal expansion of the constrictor portion 404. In one example, the constrictor portion 404 may be configured to cause the actuator portion 402 to move the shoe plate 410 farther in the radial direction 126 than a conventional seal segment having an intermediate member/ portion formed from one metal or metal alloy. For example, the intermediate member 414 may move the shoe plate 410 between a radially outward position and a radially inward position with respect to the rotor 108 responsive to the intermediate member 114 undergoing a temperature change. Furthermore, a portion of the shoe plate 410 may come closer to (or may reduce radial clearance relative to) a portion of the rotor 108 to form the primary seal at a primary seal interface 420 and/or a portion of the stator 106 to form a secondary seal at a secondary seal interface 422 as discussed further below. By taking into account the CTEs of the actuator portion 402 and the constrictor portion 404, and also how the seal segment 400 changes as a function of the environment and/or operating conditions of the rotor machine, the seal segment 400 including a bellows and one or more walls as an intermediate member 414 can be designed and/or constructed to achieve improved radially outward positions (e.g., cold radial dimensions) and radially inward positions (e.g., steady state radial dimensions) of the shoe plate 410 relative to conventional seal segments having intermediate members/portions formed from one metal or one metal alloy.

Figure 7A:
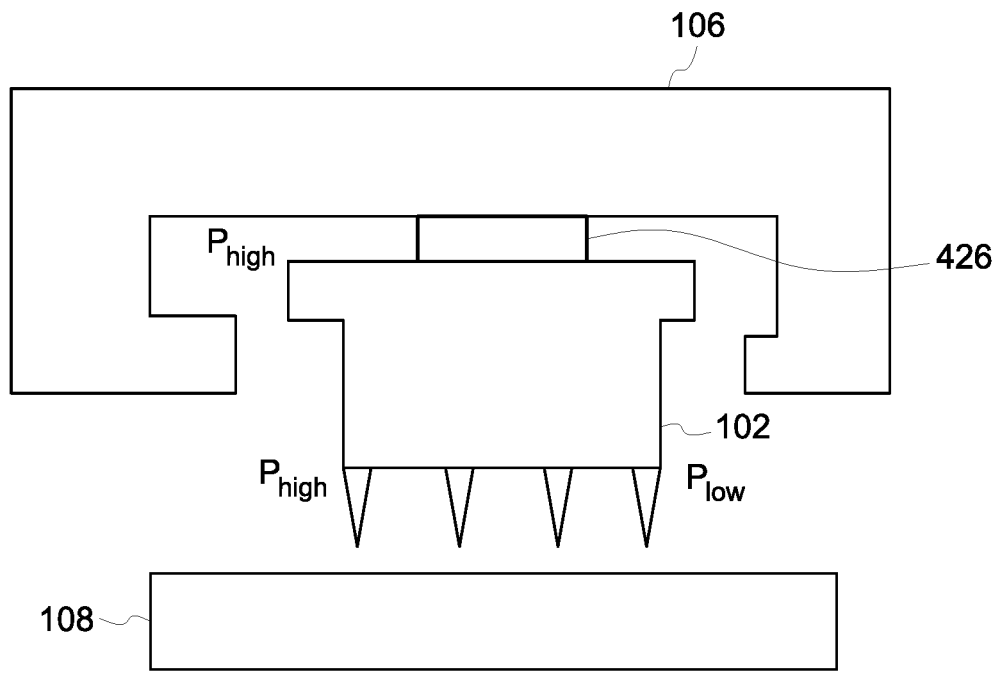
FIG. 7A illustrates a side cross-sectional view of another example of a seal segment in accordance with embodiments herein.
Figure 7B:
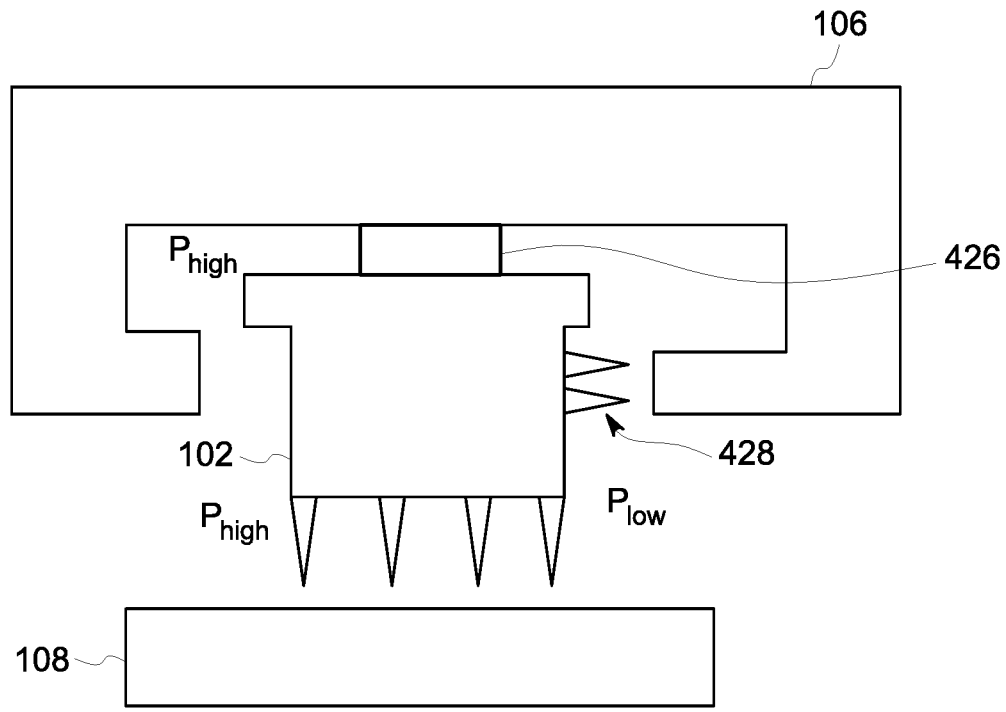
FIG. 7B illustrates a side cross-sectional view of another example of a seal segment in accordance with embodiments herein.
Figure 7C:
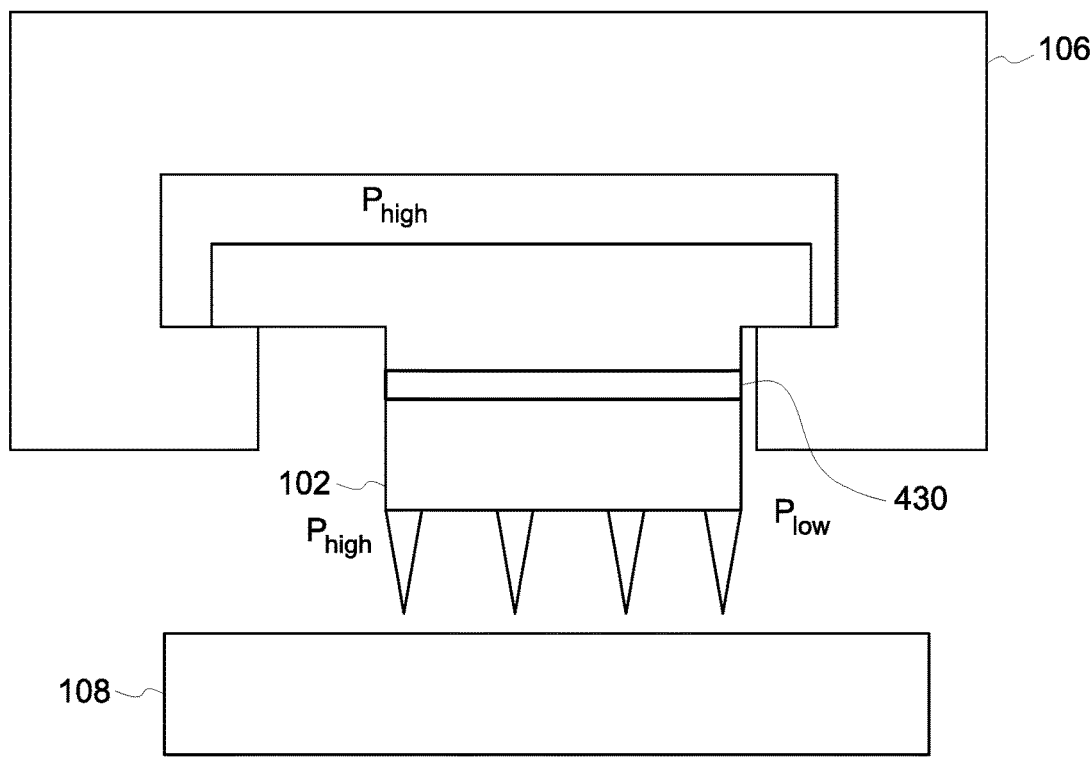
FIG. 7C illustrates a side cross-sectional view of another example of a seal segment in accordance with embodiments herein.

Optionally, a portion of the shoe plate 410 may come closer to (or may reduce radial clearance relative to) one or more of a portion of the rotor 108 to form a primary seal (e.g., via one or more teeth 424) and/or a portion of the stator 106 to form the secondary seal. FIG. 4 illustrates a physical contact-type seal between the shoe plate 410 and stator 106. In this case, the aft wards differential pressure force urging the shoe plate 410 towards $P_{low}$ is balanced by the physical contact reaction between the shoe plate 410 and stator 106. FIGS. 7A-7C illustrate side cross-sectional views different examples of non-contact-type secondary seals that can be implemented in lieu of the contact-type secondary seal illustrated in FIG. 4. FIG. 7A illustrates an example of a non-contact-type secondary seal having an axial support 426 and/or spring disposed between the stator 106 and the seal segment 102. FIG. 7B illustrates another example of a non-contact-type secondary seal having one or more of an axial tooth 428 extending towards the portion of the stator 106 forming a secondary seal. Here, the axial separation between the shoe plate 410 and the stator 106 is determined by the axial support 426 of the shoe plate 410 and the fluid film is not self-correcting (i.e., does not define its own axial film thickness based on inherent force/moment balance) in nature. FIG. 7C illustrates another example of a non-contact-type seal that includes one or more hydrostatic ports 430. The one or more hydrostatic ports provide a self-correcting and/or floating secondary seal. Here, the shoe plate 410 is not axially restrained and tends to move axially aft wards (e.g., under the influence of aft wards differential pressure) only to be self-balanced by the self-correcting force of the fluid film (i.e., fluid film forces along with axial direction increase in magnitude as the film thickness along the axial direction gets smaller until the fluid film forces balance the aft wards differential pressure force). Thus the axial film separating the shoe plate 410 and the stator 106 adjusts its thickness to balance the forces. Embodiments of seals and seal segments discussed herein can have a contact-type secondary seal, a non-contact-type secondary seal, or any other type of secondary seal known in the art.

Figure 6:
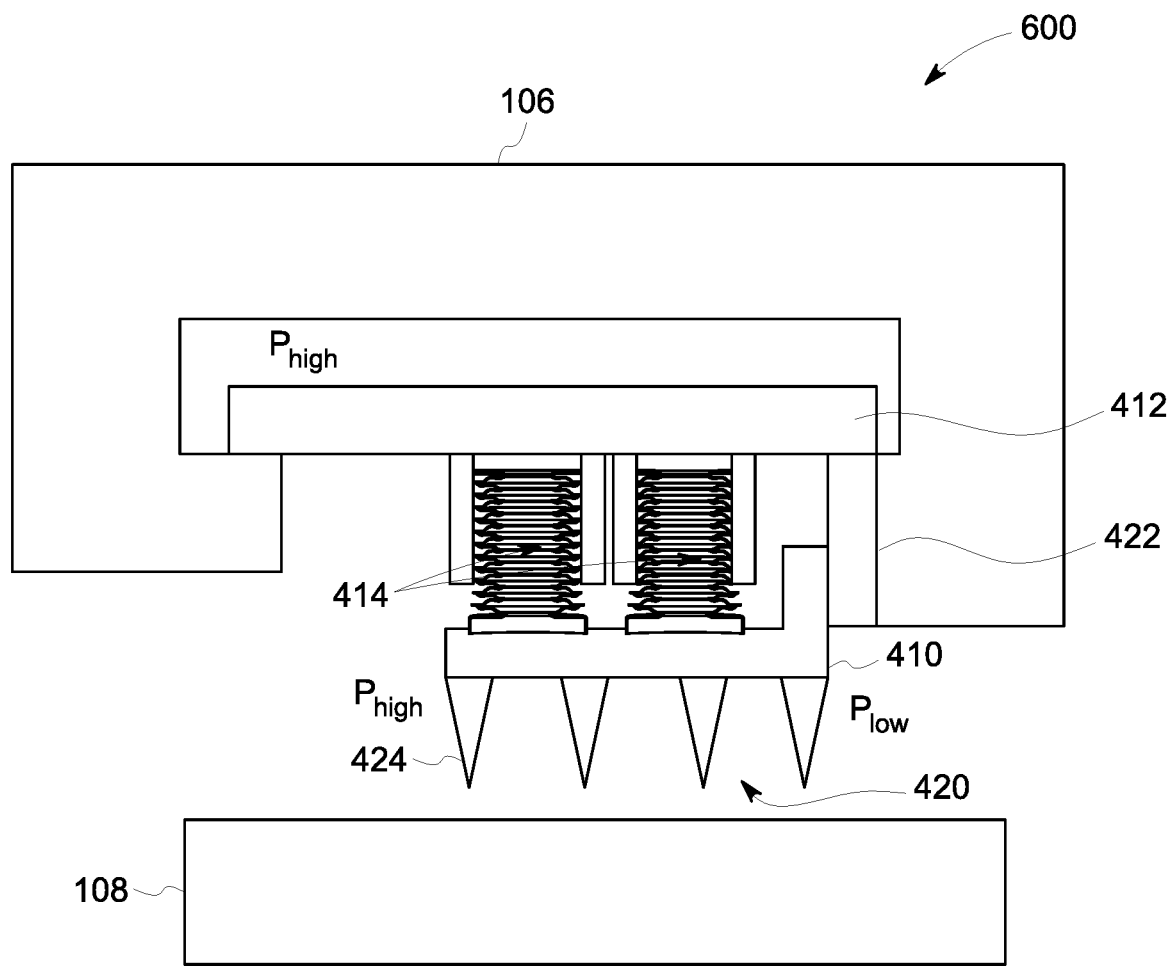
FIG. 6 illustrates a cross-sectional view of another example of a seal segment in accordance with embodiments herein.

FIG. 6 illustrates a cross-sectional view of another example of a seal segment in accordance with embodiments herein. The seal segment 600 includes a shoe plate 410, a seal base 412, and two or more intermediate members 414 coupled to and disposed between the seal base 412 and the shoe plate 410. FIG. 6 differs from FIG. 4 only in the number of intermediate members 414 coupled to and disposed between the seal base 412 and the shoe plate 410.

Figure 8:
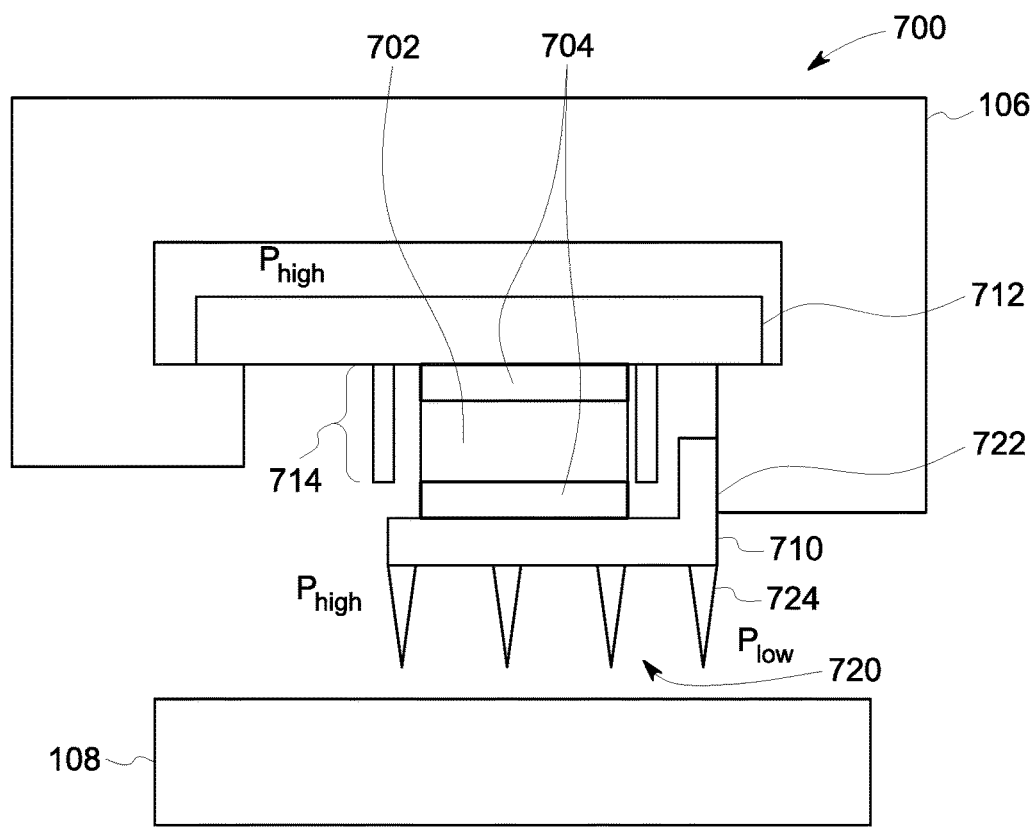
FIG. 8 illustrates a side cross-sectional view of another example of a seal segment in accordance with embodiments herein.
Figure 9A:
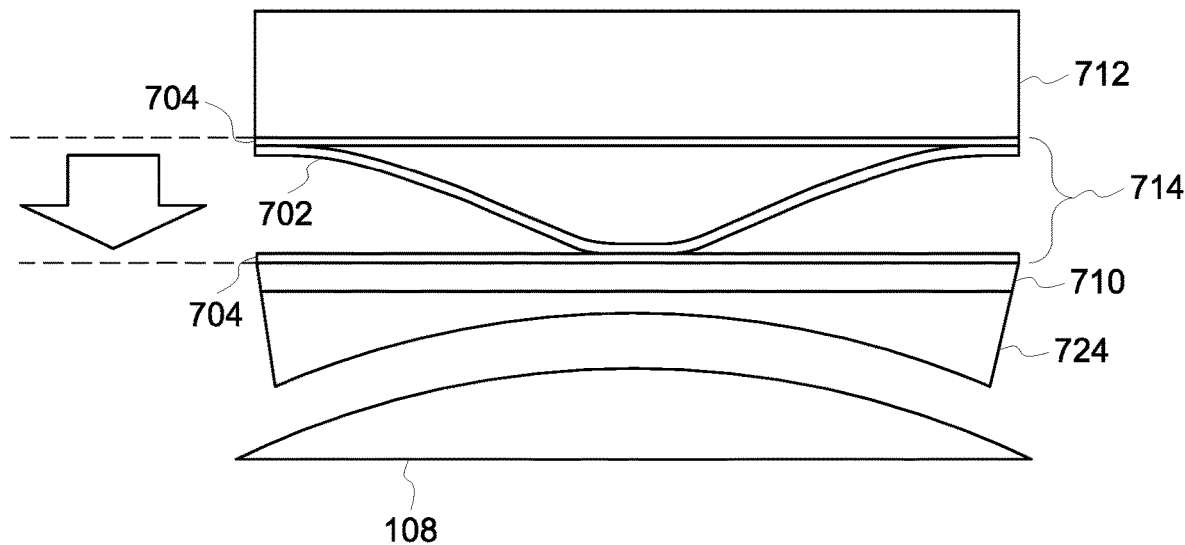
FIG. 9A illustrates a front cross-sectional view of the seal segment of FIG. 7 segment in a radially outward position in accordance with embodiments herein.
Figure 9B:
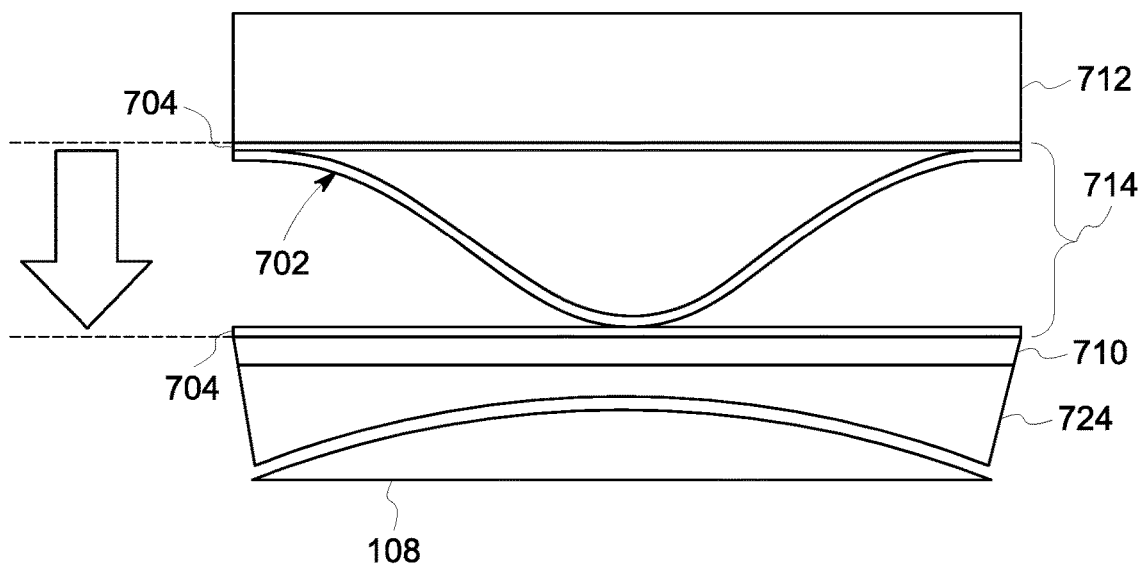
FIG. 9B illustrates a front cross-sectional view of the seal segment of FIG. 7 segment in a radially inward position in accordance with embodiments herein.

FIG. 8 illustrates a side cross-sectional view of another example of a seal segment in accordance with embodiments herein. FIGS. 9A and 9B illustrate a front view of the seal segment of FIG. 8 segment in, respectively, a radially outward position and a radially inward position. The seal segment 700 includes a shoe plate 710, a seal base 712, and at least one intermediate member 714 coupled to and disposed between the seal base 712 and the shoe plate 710. The intermediate member 714 includes an actuator portion 702 having a first coefficient of thermal expansion and a constrictor portion 704 having a different, second coefficient of thermal expansion. The actuator portion 702 and the constrictor portion 704 form a bi-material spring or leaf spring. The first coefficient of thermal expansion of the actuator portion 702 may be greater than the second coefficient of thermal expansion of the constrictor portion 704. In one example, the constrictor portion 704 may be configured to cause the actuator portion 702 to move the shoe plate 710 farther in the radial direction 126 than a conventional seal segment having an intermediate member/portion formed from one metal or metal alloy. For example, the intermediate member 714 may move the shoe plate 710 between a radially outward position (FIG. 9A) and a radially inward position (FIG. 9B) with respect to the rotor 108 responsive to the intermediate member 114 undergoing a temperature change. Furthermore, a portion of the shoe plate 710 may come closer (with reduced radial gap) to a portion of the rotor 108 to form the primary seal at a primary seal interface 720 and/or contact a portion of the stator 106 to form a secondary seal at a secondary seal interface 722 as discussed further below. By taking into account the CTEs of the actuator portion 702 and the constrictor portion 704, and also how the seal segment 702 changes as a function of the environment and/or operating conditions of the rotor machine, the seal segment 700 including a bi-material spring or leaf spring as an intermediate member 714 can be designed and/or constructed to achieve improved radially outward positions (e.g., cold radial dimensions) and radially inward positions (e.g., steady state radial dimensions) of the shoe plate 710.

Optionally, a portion of the shoe plate 710 may come closer to (or may reduce radial clearance relative to) one or more of a portion of the rotor 108 to form a primary seal and/or a portion of the stator 106 to form the secondary seal relative to a conventional seal segment having an intermediate member/portion formed from one metal or one metal alloy. For example, one or more of an axial tooth extending in the axial direction 124 (not shown) towards the portion of the stator may form a secondary seal or one or more of a radial tooth 724 extending in the radial direction 126 towards the portion of the rotor may form a primary seal. Additionally or alternatively, the shoe plate 710 may be configured to form a frictionless or low-friction secondary seal with the portion of the stator 106 through a self-correcting fluid film disposed between the shoe plate 710 and the portion of the stator 106.

Figure 10:
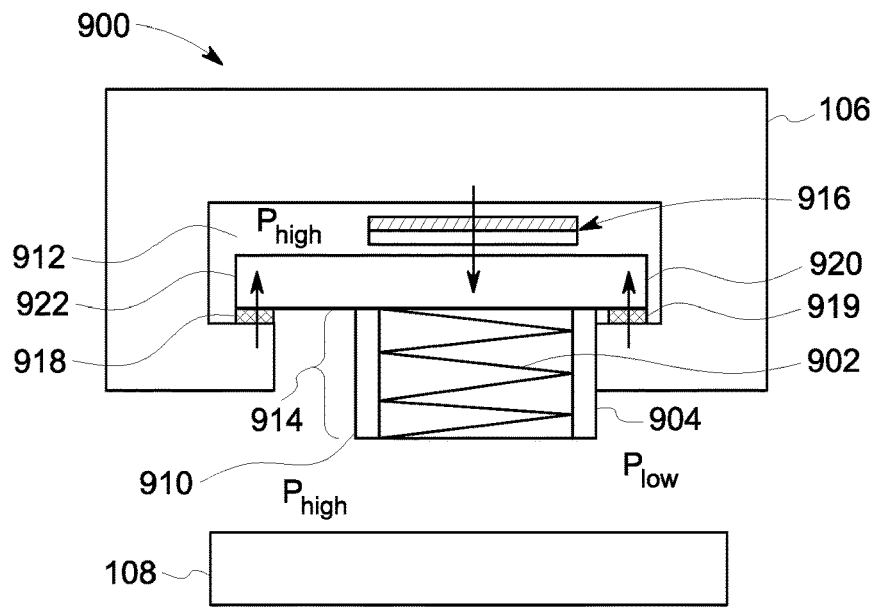
FIG. 10 illustrates a side cross-sectional view of another example of a seal segment in accordance with embodiments herein.
Figure 11A:
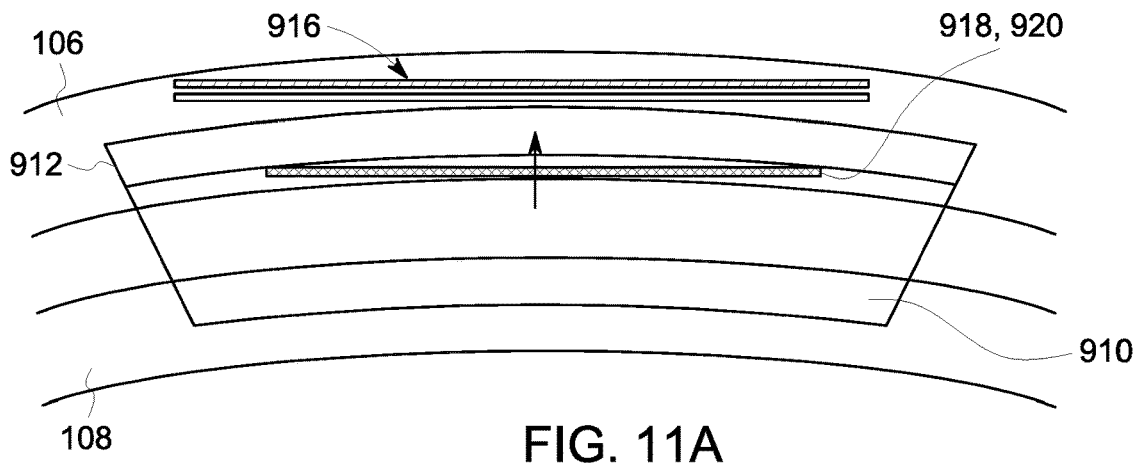
FIG. 11A illustrates a front cross-sectional view of the seal segment of FIG. 10 segment in a radially outward position in accordance with embodiments herein.
Figure 11B:
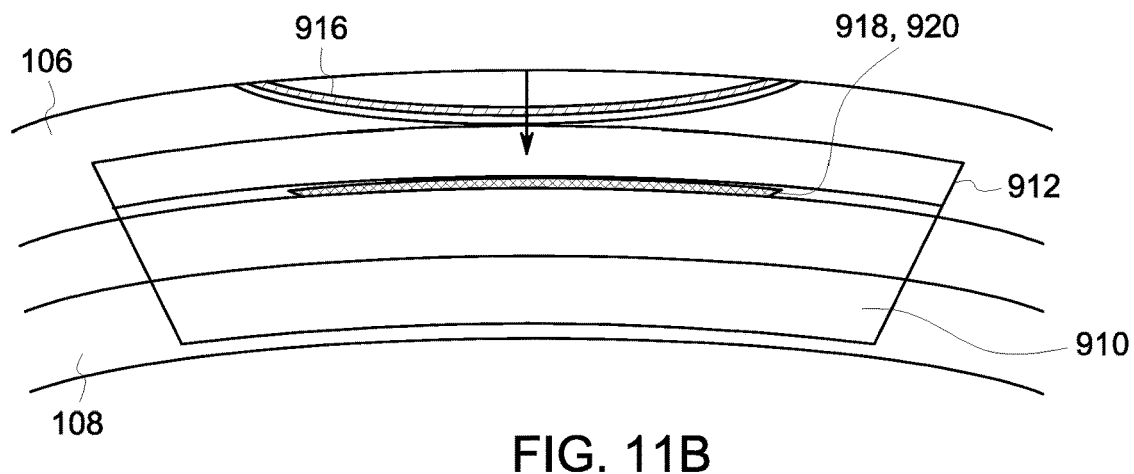
FIG. 11B illustrates a front cross-sectional view of the seal segment of FIG. 10 segment in a radially inward position in accordance with embodiments herein.

FIG. 10 illustrates a side cross-sectional view of another example of a seal segment in accordance with embodiments herein. FIGS. 11A and 11B illustrate a front view of the seal segment of FIG. 10 in, respectively, a radially outward position and a radially inward position. The seal segment 900 includes a shoe plate 910, a seal base 912, and at least one first intermediate member 914 coupled to and disposed between the seal base 912 and the shoe plate 910. The first intermediate member 914 includes an actuator portion 902 having a first coefficient of thermal expansion and a constrictor portion 904 having a different, second coefficient of thermal expansion. The seal segment 900 may also include a second intermediate member 916 positioned between a radially outward surface of the seal base and the stator. In one example, the second intermediate member 916 may urge the seal segment 900 toward the radially inward position as the rotary machine heats up. In an additional or alternative example, the second intermediate member 916 may function as a conventional spring (e.g., a leaf spring, a bellows spring, or the like) when the rotary machine reaches a select temperature (e.g., a steady state operating temperature). Additionally or alternatively, the seal segment 900 may also include third and fourth intermediate members 918, 919 positioned between the stator 106 and a radially inward surface of the seal base 912 at respective opposed first and second hook portions 920, 922 of the seal base. In one example, the third and fourth intermediate members 918, 919 may urge the seal segment 900 toward the radially outward position as the rotary machine heats up. In an additional or alternative example, the third and fourth intermediate members 916, 918 may function as conventional springs (e.g., a leaf spring, a bellows spring, or the like) or relax (e.g., no longer exert a material level of force) when the rotary machine reaches a select temperature (e.g., a steady state operating temperature). The least one first intermediate member 914, the second intermediate member 916, and the third and fourth intermediate members 920, 922 may each be either the intermediate member 414 described in FIGS. 4-6 or the intermediate member 714 described in FIGS. 8-9B. By adding the second intermediate member 916 and/or the third and fourth intermediate members 920, 922, the seal segment 900 may be designed and/or constructed to achieve even greater improved radially outward positions (e.g., cold radial dimensions) and radially inward positions (e.g., steady state radial dimensions) of the shoe plate 910 and/or performance of the seal segment 900. Optionally, the seal segment 900 may form a primary seal and/or a secondary seal as described for any other seal segment herein.

In accordance with embodiments herein, the seal segments 102, 400, 600, 700, 900 exhibit an increased effective coefficient of thermal expansion in at least the radial direction 126 relative to conventional seal segments that are formed from bulk materials (e.g., seal segments with intermediate members/portions formed from one metal or one metal alloy). In an example, the relatively long length of the concertinaed and/or convoluted actuator portion 404 results in a larger thermal response in directions that are not constrained by the lower CTE of the constrictor portion 404. In an additional or alternative example, seal segments 102, 400, 600, 700, 900 constrained in the axial direction 124 and the circumferential direction 128 will grow more in the radial direction 126 than a segment of a conventional seal because of this increased effective coefficient of thermal expansion.

Figure 12:
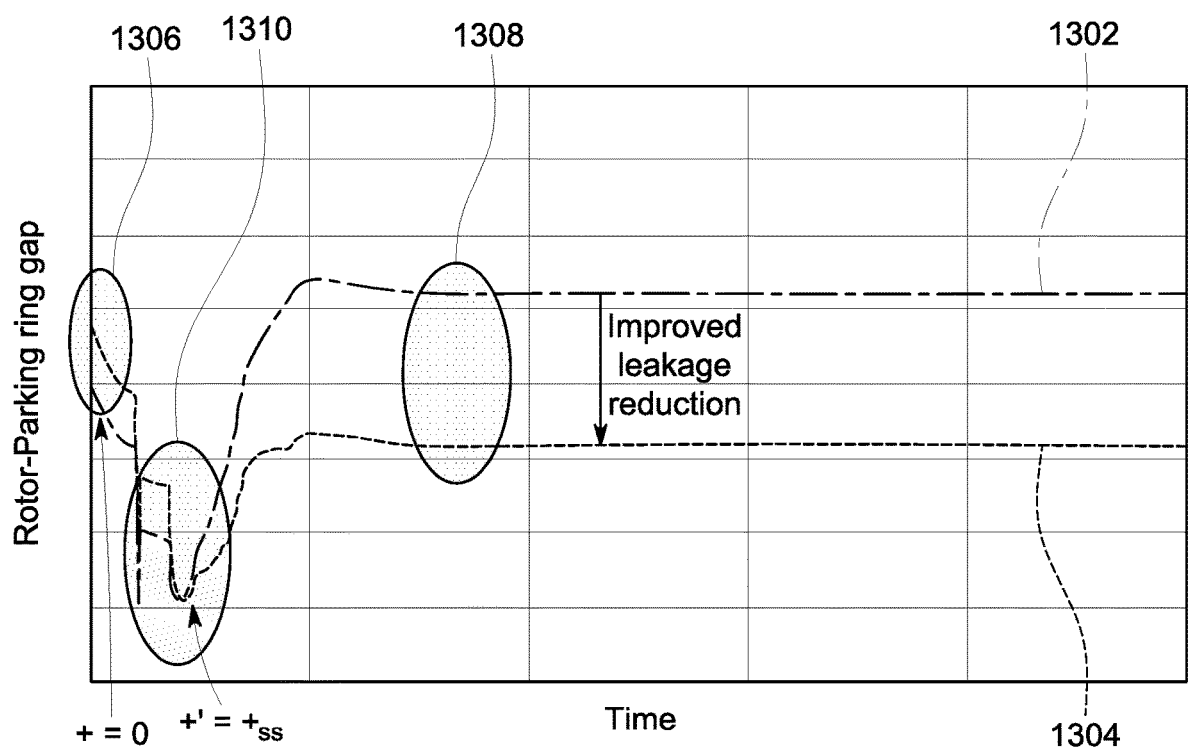
FIG. 12 illustrates an example relationship between the rotor-packing ring gap and time during operation of a rotary machine for an example seal assembly in accordance with embodiments herein and a conventional seal assembly.

FIG. 12 illustrates an example relationship between the rotor-packing ring gap and time during operation of a rotary machine for an example seal assembly (e.g., including one or more seal segments seal segments 102, 400, 600, 700, 900) in accordance with embodiments herein and a conventional seal assembly formed from bulk materials (e.g., having seal segments with intermediate members/portions formed from one metal or one metal alloy). The first trend line 1302 represents the thermal response (e.g., the changes over time in the rotor-seal assembly gap) from a cold start (t=0) to a steady state (t>$t_{ss}$) of an example conventional seal assembly. The second trend line 1304 represents the thermal response (e.g., the changes over time in the rotor-seal assembly gap) from the cold start (t=0) to the steady state ($t>t_{ss}$) of an example seal assembly (e.g., including one or more seal segments seal segments 102, 400, 600, 700, 900). The seal segments 102, 400, 600, 700, 900 of the seal assembly may be configured to have a predetermined thermal response based on the thermal loads for an operating environment associated with a rotary machine. The predetermined thermal response may include improved radially outward positions (e.g., cold radial dimensions 1306) and improved radially inward positions (e.g., steady state radial dimensions 1308) of the example seal assembly with respect to the rotor 108 relative to conventional seal assemblies, resulting in improved leakage reduction (e.g., 40% or greater steady state leakage reduction). The predetermined thermal response may include improved transient positions (e.g., start-up transient dimensions 1310) of the example seal assembly with respect to the rotor 108 relative to conventional seal assemblies, resulting in improved leakage reduction (e.g., 40% or greater steady state leakage reduction). The seal segments 102, 400, 600, 700, 900 may improve radial operation and significantly reduce the leakage rates over conventional seal segments (e.g., formed from bulk materials) by allowing for improved start-up and steady state clearances with respect to the rotor.

A method for manufacturing the seal segments 102, 400, 700, 900 described herein can include forming one or more seal segments 102, 400, 700, 900 of a seal assembly for the rotary machine 102 using additive manufacturing. The seal segments 102, 400, 700, 900 are configured (e.g., shaped) to circumferentially extend around a rotor 108 between a stator 106 and the rotor 108 of the rotary machine 102. The seal segments 102, 400, 700, 900 may be positioned circumferentially intermediate to the stator 106 and the rotor 108 of the rotary machine 102.

Forming the seal segments 102, 400, 700, 900 can include forming the seal base 112, 412, 712, 912 at least one intermediate member 114, 414, 714, 914, 916, 918, 919 and the shoe plate 110, 410, 710, 910 using additive manufacturing. Forming at least one intermediate member 114, 414, 714, 914, 916, 918, 919 includes forming at least one bi-material interface between an actuator portion 402, 702, 902 comprising a first metal alloy and a constrictor portion 404, 704, 904 comprising a second metal alloy. The coefficient of thermal expansion of the actuator portion may be greater than the coefficient of thermal expansion of the constrictor portion. Forming the at least one intermediate member may include configuring the constrictor portion to cause the actuator portion to move the shoe plate farther in the radial direction 126 than a conventional seal segment having an intermediate member/portion formed from one metal or metal alloy. Forming the at least one intermediate member may include forming, as the actuator portion, a bellows, and forming, as the constrictor portion, at least one wall extending orthogonally from the seal base towards the shoe plate. Additionally or alternatively, the actuator portion and the constrictor portion may form a leaf spring. Forming the seal segments 102 also includes joining a first end of the at least one intermediate member to the seal base and joining an opposing second end of the at least one intermediate member to the shoe plate. This process might include additively forming one or more of, or all of, the seal base, the at least one intermediate member, and the shoe plate as one single assembly. Additionally or alternatively, one or more of, or each of, these items may be formed additively and separately, and assembled together with joining processes such as bolting, welding, brazing, and the like.

This additive manufacturing process may be followed by precision machining operations to achieve desired surface finish and tight tolerances on critical dimensions of the seal segment or portions thereof. Additionally or alternatively, this additive manufacturing process may be followed by a coating process to apply low wear, low friction coatings to one or more surfaces of the seal segment. For example, a coating may be applied to one or more of a load-bearing surface, a primary seal surface, or a secondary seal surface of the shoe plate.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, in the above description and following claims, the phrases "at least A or B", "A and/or B", "one or more of A and B", and "one or more of A or B" (where "A" and "B" represent claim elements), are used to encompass i) A, ii) B and/or iii) both A and B.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are example embodiments. Many other embodiments will be apparent to those of skill in the art upon reviewing the above description. The scope of the subject matter described herein should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A rotary machine seal assembly comprising:
   seal segments configured to circumferentially extend around a rotor between a stator and the rotor of a rotary machine, one or more of the seal segments including:
   a shoe plate configured to be disposed along the rotor, wherein the shoe plate defines a radially outer most surface, the shoe plate configured to form a primary seal with the rotor and a secondary seal with a portion of the stator;
   a seal base configured to be disposed radially outward of the shoe plate; and
   at least one intermediate member coupled to and disposed between the seal base and the shoe plate, the at least one intermediate member including an actuator portion having a first coefficient of thermal expansion and a constrictor portion having a different, second coefficient of thermal expansion, wherein the constrictor portion comprises a first wall and a second wall extending radially inward from an inner surface of the seal base towards the shoe plate, wherein the constrictor portion defines a radially inner most surface, wherein a radial gap is formed between the radially inner most surface of the constrictor portion and the radially outer most surface of the shoe plate, wherein the actuator portion is at least partially disposed within the constrictor portion between the first wall and the second wall, the at least one intermediate member configured to move the shoe plate from a radially outward position to a radially inward position with respect to the rotor responsive to the at least one intermediate member undergoing a temperature change.

2. The seal assembly of claim 1, wherein the first coefficient of thermal expansion of the actuator portion is greater than the second coefficient of thermal expansion of the constrictor portion.

3. The seal assembly of claim 1, wherein the constrictor portion is configured to cause the actuator portion to move the shoe plate farther in a radial direction than an intermediate member formed from a single metal or a single metal alloy.

4. The seal assembly of claim 1, wherein the actuator portion comprises a bellows.

5. The seal assembly of claim 4, wherein the bellows comprises one or more elongated structures that are one or more of concertinaed or convoluted to form a pattern along a length of the actuator portion extending in a radial direction.

6. The seal assembly of claim 1, wherein the actuator portion comprises a leaf spring.

7. The seal assembly of claim 1, wherein the at least one intermediate member includes a second intermediate member positioned between a radially outward surface of the seal base and the stator.

8. The seal assembly of claim 7, wherein the at least one intermediate member includes a third intermediate member and a fourth intermediate member, the third and fourth intermediate members positioned between the stator and a radially inward surface of the seal base at respective opposed first and second hook portions of the seal base.

9. The seal assembly of claim 1, wherein the shoe plate includes one or more of an axial tooth extending in an axial direction towards the portion of the stator to form a secondary seal or one or more of a radial tooth extending in a radial direction towards a portion of the rotor to form a primary seal.

10. The seal assembly of claim 1, wherein the shoe plate is configured to form a frictionless or low-friction secondary seal with the portion of the stator through a self-correcting fluid film disposed between a surface of the shoe plate and the portion of the stator.

11. The seal assembly of claim 10, wherein the self-correcting fluid film between the surface of the shoe plate and the portion of the stator is supplied with fluid from a high-pressure side to a low pressure side of the seal assembly via one or more internal passages disposed in one or more seal segments that extend between the high pressure side and the low pressure side.

12. A method, comprising:
   additively forming one or more seal segments of a seal assembly for a rotary machine, wherein the one or more seal segments are configured to circumferentially extend around a rotor between a stator and the rotor of the rotary machine, including:
   forming a seal base, at least one intermediate member, and a shoe plate defining a radially outer most surface, wherein forming at least one intermediate member includes forming at least one bi-material interface between an actuator portion comprising a first metal alloy and a constrictor portion comprising a second metal alloy, wherein the constrictor portion comprises a first wall and a second wall extending radially inward from an inner surface of the seal base towards the shoe plate and defines a radially inner most surface, wherein a radial gap is formed between the radially inner most surface of the constrictor portion and the radially outer most surface of the shoe plate, wherein the actuator portion is at least partially disposed within the constrictor portion between the first wall and the second wall; and
   joining a first end of the at least one intermediate member to the seal base and joining an opposing second end of the at least one intermediate member to the shoe plate.

13. The method of claim 12, wherein the coefficient of thermal expansion (CTE) of the actuator portion is greater than the CTE of the constrictor portion.

14. The method of claim 12, wherein forming the at least one intermediate member further comprises configuring the constrictor portion to cause the actuator portion to move the shoe plate farther in a radial direction than an intermediate member formed from a single metal or a single metal alloy.

15. The method of claim 14, wherein forming the at least one intermediate member further comprises forming, as the actuator portion, a bellows.

16. The method of claim 14, wherein the actuator portion comprises a leaf spring.

\* \* \* \* \*